(12) United States Patent
Pietsch

(10) Patent No.: US 9,333,673 B2
(45) Date of Patent: May 10, 2016

(54) METHOD FOR SIMULTANEOUSLY CUTTING A MULTIPLICITY OF WAFERS FROM A WORKPIECE

(71) Applicant: Siltronic AG, Munich (DE)

(72) Inventor: Georg Pietsch, Burghausen (DE)

(73) Assignee: SILTRONIC AG, Munich (DE)

( * ) Notice: Subject to any disclaimer, the term of this patent is extended or adjusted under 35 U.S.C. 154(b) by 60 days.

(21) Appl. No.: 14/493,445

(22) Filed: Sep. 23, 2014

(65) Prior Publication Data
US 2015/0083104 A1    Mar. 26, 2015

(30) Foreign Application Priority Data
Sep. 26, 2013   (DE) .......................... 10 2013 219 468

(51) Int. Cl.
*B28D 5/04*      (2006.01)
*B23D 57/00*     (2006.01)
*B24B 27/06*     (2006.01)

(52) U.S. Cl.
CPC ............ *B28D 5/045* (2013.01); *B23D 57/0023* (2013.01); *B23D 57/0061* (2013.01); *B24B 27/0633* (2013.01); *B24B 27/0691* (2013.01)

(58) Field of Classification Search
CPC ........... B24B 27/0633; B24B 27/0691; B23D 57/0023; B23D 57/0061
USPC ......................................................... 125/21
See application file for complete search history.

(56) References Cited

U.S. PATENT DOCUMENTS

| | | | | |
|---|---|---|---|---|
| 5,439,723 A * | 8/1995 | Miyashita | ............ | B28D 5/0005 428/131 |
| 5,993,292 A * | 11/1999 | Oishi | ...................... | C30B 33/00 125/13.02 |
| 6,062,209 A * | 5/2000 | Oishi | ................... | B23D 7/0046 125/16.01 |
| 6,145,422 A * | 11/2000 | Katamachi | ........... | B23Q 16/001 125/21 |
| 6,422,067 B1 * | 7/2002 | Oishi | ..................... | B28D 1/025 125/21 |
| 6,941,940 B1 * | 9/2005 | Zavattari | ............ | B23D 57/0061 125/16.02 |
| 8,851,059 B2 * | 10/2014 | Grumbine | ............ | B28D 5/0076 125/13.01 |
| 2004/0045637 A1 | 3/2004 | Tanaka et al. | | |

(Continued)

FOREIGN PATENT DOCUMENTS

| | | |
|---|---|---|
| CN | 101204836 A | 6/2008 |
| CN | 201235584 Y | 5/2009 |
| CN | 102285010 A | 12/2011 |

(Continued)

*Primary Examiner* — Lee D Wilson
*Assistant Examiner* — Henry Hong
(74) *Attorney, Agent, or Firm* — Leydig, Voit & Mayer, Ltd.

(57) ABSTRACT

A method for simultaneously cutting a multiplicity of wafers from a cylindrical workpiece having an axis and a notch applied parallel to the axis in a lateral surface of the workpiece includes applying a cut-in beam on the workpiece where the cut-in beam has a head end and a foot end. The head end is inserted into the notch of the workpiece. The workpiece is held with a feed device so as to position an axis of the work piece parallel to the axes of cylindrical wire guide rollers of a wire saw. The cut-in beam is moved through a planar wire web, where the planar wire web has sections of wire arranged parallel to one another and perpendicular to the axes of the wire guide roller. The wire sections are moved the longitudinal wire direction in the presence of abrasives.

14 Claims, 6 Drawing Sheets

(56) References Cited

U.S. PATENT DOCUMENTS

| | | | |
|---|---|---|---|
| 2006/0107940 A1* | 5/2006 | Ji | B24B 27/0633 125/21 |
| 2008/0149085 A1 | 6/2008 | Skovgaard-Soerensen | |
| 2010/0163009 A1* | 7/2010 | Kawasaki | B23D 57/0023 125/16.01 |
| 2011/0192388 A1 | 8/2011 | Kaeser et al. | |
| 2015/0314484 A1* | 11/2015 | Pietsch | B23D 57/0023 125/21 |

FOREIGN PATENT DOCUMENTS

| | | |
|---|---|---|
| CN | 102373016 A | 3/2012 |
| EP | 0789091 A1 | 8/1997 |
| JP | 10249699 A | 3/1997 |
| JP | 10256106 A | 9/1998 |
| JP | 2007301688 A | 11/2007 |
| TW | 201127586 A | 8/2011 |
| TW | 201134634 A | 10/2011 |
| WO | WO 0191982 A1 | 12/2001 |
| WO | 2009153887 A1 | 12/2009 |
| WO | WO 2009153887 A1 | 12/2009 |
| WO | WO 2011081532 A1 | 7/2011 |
| WO | 2013041140 A1 | 3/2013 |
| WO | WO 2013041140 A1 | 3/2013 |

\* cited by examiner

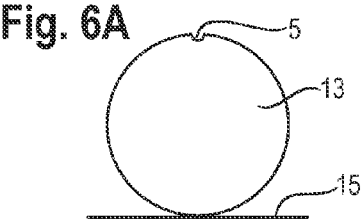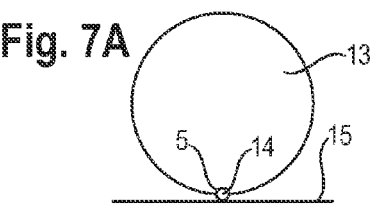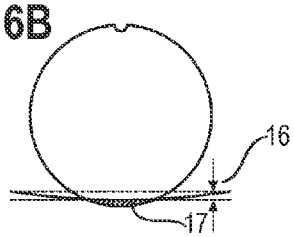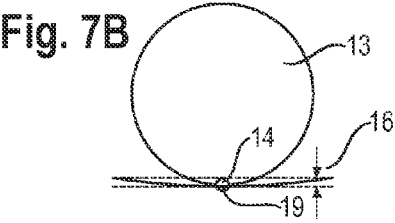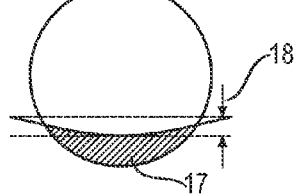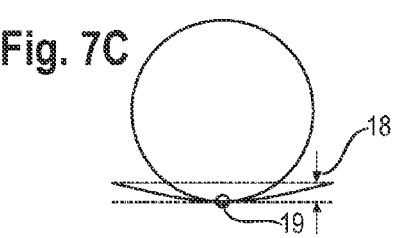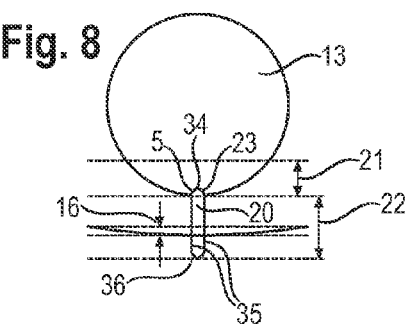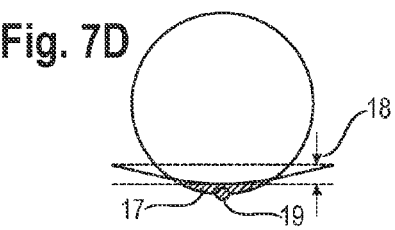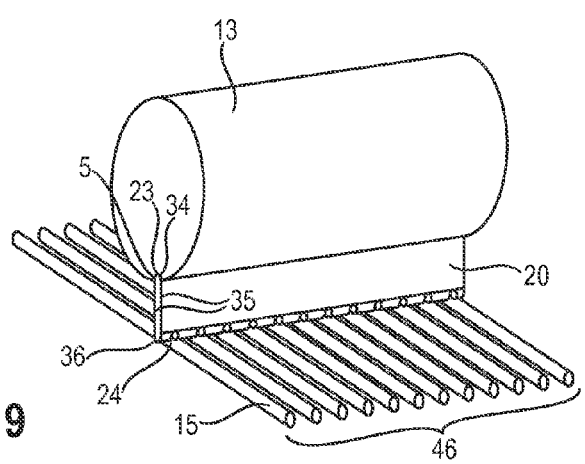

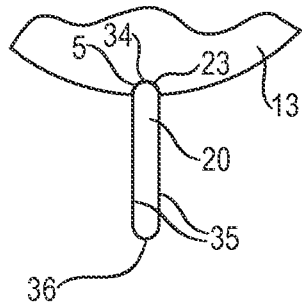 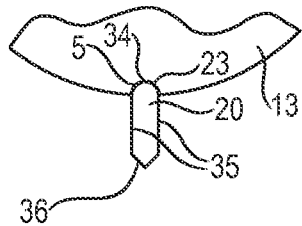 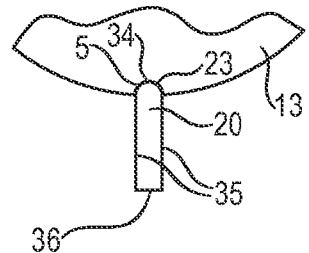
Fig. 13A    Fig. 13B    Fig. 13C
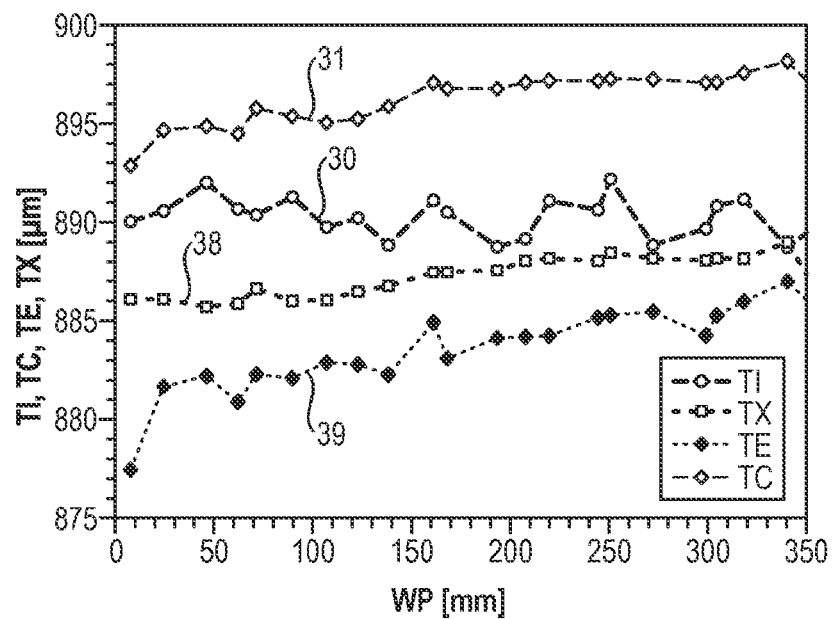
Fig. 14

METHOD FOR SIMULTANEOUSLY CUTTING A MULTIPLICITY OF WAFERS FROM A WORKPIECE

CROSS REFERENCE TO RELATED APPLICATIONS

This application claims priority from German Patent Application No. DE 10 2013 219 468.4, filed Sep. 26, 2013, which is hereby incorporated by reference herein in its entirety.

FIELD

The present invention relates to a method for simultaneously cutting a multiplicity of wafers of the same type from a workpiece, in particular semiconductor wafers from a circular-cylindrical crystal, by means of lapping assisted by a wire.

BACKGROUND

Many applications require a multiplicity of workpieces of the same type, and of the same shape, in slice form, which are obtained by cutting from a stock piece. A slice is a cylinder, the height of which is small compared with the dimensions of its base surface. A cylinder is a body bounded by two parallel, plane and congruent base surfaces and a lateral surface, the lateral surface being spanned by all parallel straight lines which intersect the edges of the two base surfaces.

Slices of right cylindrical shape are important. In a right cylinder, the straight lines of the lateral surface extend perpendicularly to the base surfaces. Right cylindrical slices with a polygonal base surface, i.e. right prisms, or circular base surface, i.e. right circular cylinders, are of particular importance.

Examples of right cylindrical slices with a polygonal base surface are photovoltaic cells ("solar cells"), the base surfaces of which are usually square or approximately octagonal.

Examples of right cylindrical slices with a circular base surface are slices of semiconductor material, which are used as substrates for the patterning of electronic, microelectronic or microelectromechanical components, or which are used as a support for the deposition of various coatings.

Semiconductor materials comprise elemental semiconductors, such as silicon or germanium, and compound semiconductors, for example gallium arsenide or silicon carbide, or composites or layered structures thereof. Examples of supports for the deposition of various coatings are slices of silicon, gallium arsenide or silicon carbide, on which for example gallium arsenide is applied in order to produce semiconductor lasers or LEDs (light-emitting diodes), or slices of aluminum, glass or ceramic, on which magnetizable layers are applied in order to produce hard-disk memories, or supports made of glass for the application of optical coatings (mirrors, filters), so-called optical flats. Further examples are slices of optically birefringent crystals such as potassium dihydrogen phosphate (KDP), lithium niobate, etc., for use in nonlinear optics (frequency doubling in lasers), slices of sapphire ($Al_2O_3$), ceramic, and many others.

Often, these slices are also referred to as wafers, particularly those made of silicon (photovoltaics, microelectronics) or gallium arsenide and silicon carbide (optoelectronics). Usually, one of the two base surfaces of the cylindrical wafers is designated as a component- or function-carrying side in relation to the base surface lying opposite it. The side designated in this way is then referred to as the front side, and the side lying opposite the front side as the back side of the wafer.

The stock pieces from which the wafers are cut are also referred to as ingots. These ingots generally have a cylindrical, usually right cylindrical, shape, the base surface of which is congruent with that of the wafers obtained from it. The main axis of inertia of the ingot with the lowest moment of inertia is referred to as the ingot axis. For right prismatic ingots with a regular polygonal base surface, or for ingots with a right circular-cylindrical shape, the ingot axis is the same as the symmetry axis of the ingot.

Semiconductor wafers as substrates for microelectronic components are usually provided in the edge region with a notch or a flat. The notch or flat marks a designated crystal direction and is applied on the ingot by milling an axial groove, the notch groove, or grinding an axial flat, the flat surface, before the cutting into wafers. After the cutting, the semiconductor wafers are usually provided with an identification code on their front or rear side by laser scribing in the immediate vicinity of the direction mark.

Cutting methods referred to as "wire sawing" have particular importance for cutting the ingots into wafers. In wire sawing, the entire ingot is cut simultaneously into a multiplicity of wafers of the same type in a device referred to as a wire saw. Wire sawing is therefore a discontinuous batch process. A device suitable for carrying out wire sawing is referred to as a wire saw.

A wire saw comprises wire, at least two cylindrical wire guide rollers, a device for holding and moving the ingot, and grinding agent. The axes of the ingot and of the wire guide rollers are arranged parallel to one another. The lateral surfaces of the wire guide rollers are provided with a multiplicity of parallel grooves, essentially equidistant from one another, which are respectively continuous and extend perpendicularly to the wire guide roller axis. The wire is guided in a spiral externally around the wire guide rollers, in such a way that it respectively comes to lie precisely once in each groove of each wire guide roller, and a wire web consisting of wire sections extending parallel to one another and perpendicularly to the wire guide roller axis is tensioned between two wire guide rollers.

The cutting process comprises movement of the wire in the longitudinal wire direction by rotation of all the wire guide rollers in the same sense with the same circumferential speed, feeding of the ingot perpendicularly onto the wire web, and the supply of grinding agent. By the relative movement of the wire with respect to the ingot, with the aid of the grinding agent the wire causes material abrasion from the ingot upon contact with the ingot and during continued feeding of the ingot. With continued feeding, the wire web thus works slowly through the ingot and produces a multiplicity of wafers of the same type simultaneously.

For most applications, wafers of exactly equal thickness are required. Since the wire is subjected to a thickness decrease due to wear during the cutting, the grooves in the wire guide rollers are usually provided with distances from one another decreasing slightly from the fresh wire side to the used wire side.

On its side facing away from the wire web at the start of cutting, the ingot is adhesively bonded to an ingot mounting beam. The cutting process is ended as soon as all the wire sections of the wire web have cut through the ingot fully, and have fully arrived in the ingot mounting beam. The cut wafers then remain suspended from the half-cut mounting beam like teeth on a comb, and are still connected along a part of their lateral surfaces by the adhesive joint to the ingot mounting beam which has been cut into. The ingot mounting beam consists of a material which is easy to cut, for example hard carbon, plastic, a mineral material or a composite of these or other materials.

By reversing the feed direction, the ingot—now cut into wafers—is moved out of the wire web and the wafers are separated by releasing the adhesive bond. The release of the adhesive bond is referred to as uncementing. The adhesives used are, for example, soluble in water, by modifying the pH, soluble in solvent or thermally soluble, so that by immersing the cut ingot into a suitable liquid or heating, all the wafers can be uncemented simultaneously, or the adhesive joints are separated successively by breaking, cutting, laser or water jet separation, and the ingot is separated wafer by wafer.

The length to which each wire section extends inside the ingot at any time of the cutting is referred to as the engagement length of the respective wire section. The greatest engagement length which occurs throughout the cutting process is referred to as the diameter of the ingot. The moment of the cutting process at which the wire comes in contact with the workpiece for the first time is referred to as cut-in. For non-rotationally symmetrical ingots, the diameter as defined above is therefore dependent on the orientation (angular position) with which the ingot is cemented onto the ingot mounting beam.

The various wire sawing methods may be distinguished according to the engagement length: in the case of cuboid ingots, which are orientated with a side surface parallel to the wire web, the engagement length is constant throughout the cutting process for all the wire sections. In the case of generally prismatic but not cuboid ingots, which are orientated with a side surface parallel to the wire web, the engagement length at cut-in is finite and generally variable in the further course of the cutting process. In the case of ingots which do not have a side surface orientated parallel to the wire web, the engagement length at cut-in is zero, then initially increases in the further course of the cutting process, and is generally variable and finite throughout the cutting process. In the case of circular-cylindrical ingots, it is zero at cut-in, then increases to a maximum, before subsequently decreasing and decreasing to zero again upon exit.

The various wire sawing processes may furthermore be subdivided into lapping and grinding, according to the mechanism of the material abrasion:

In the case of lapping, a suspension of abrasively acting hard substances is supplied to the wire. The material erosion takes place by a three-body interaction (1 ingot, 2 abrasive, 3 wire) by means of lapping. Lapping refers to breaking of the material cohesion by locally exceeding the material strength by Hertzian pressing with microcrack formation between freely mobile abrasives and the workpiece surface (brittle erosive abrasion). The suspension of the abrasives in a carrier liquid is also referred to as a slurry.

In the case of grinding, abrasively acting hard substances are fixed into the surface of the wire. The wire acts as a tool carrier, the fixed abrasives act as tools, and the material erosion takes place by a two-body interaction (1 ingot, 2 abrasive) by means of grinding. Grinding refers to breaking of the material cohesion by cut-in of a spatially invariantly oriented cutting edge and removal of cuttings by carving through the workpiece surface parallel to the workpiece surface.

A chip is intended to mean a fragment of the workpiece released from the workpiece by the cutting action. The abrasives have the shape of irregular polyhedra (many-sided bodies). The abrasives are also referred to as grains. A cutting edge refers to the edge of a face of the polyhedron, oriented in the movement direction of the abrasive and coming in contact with the workpiece, at which edge the workpiece material is cut through and a chip thus released. The cutting angle is intended to mean the angle at which the face of the grain with the cutting edge engaging with the workpiece is placed with respect to the surface of the workpiece.

In the case of lapping, owing to its free movement in the slurry, each grain has cutting edges and cutting angles which vary over time. In the case of grinding, although each individual grain has a respectively time-invariant cutting edge with a time-invariant cutting angle owing to its fixed connection to the tool carrier (wire), ignoring wear of the grain, for example due to splintering during the grinding process, so that new cutting edges may be formed, all of the cutting edges engaging during the grinding and cutting angles of all the grains are random cutting faces and cutting angles. Lapping and grinding are therefore referred to as cutting methods with geometrically undetermined cutting edges.

Lastly, the various wire sawing methods may be distinguished according to the nature of the wire movement, in a saw with unidirectional wire movement or a saw with continual direction reversal of the wire movement.

In the case of unidirectional sawing, the wire is wound throughout the cutting process in precisely one longitudinal wire direction from a feed spool to a take-up spool. In the case of sawing with continual direction reversal of the wire movement, the direction of the longitudinal wire movement is continually reversed. Within the group of sawing methods with continual direction reversal of the wire movement, the reciprocating step method is particularly important.

According to the reciprocating step method, the cutting consists of a sequence of so-called reciprocating steps or "pilgrim steps". A reciprocating step comprises precisely movement of the wire through a first length in a first longitudinal wire direction and subsequent movement of the wire through a second length in a second direction, precisely the opposite of the first direction, the second length being selected to be shorter than the first length. During a reciprocating step, a wire length corresponding in total to the sum of the two lengths thus passes through the workpiece, while the wire section coming in cutting engagement with the workpiece is moved forward from the feed spool to the take-up spool in total only by an amount corresponding to the difference between the two lengths. In the reciprocating step method, the wire is thus used repeatedly by the factor given by the ratio of the sum to the difference of the two lengths. The difference between the two lengths is also referred to as the "net movement" of the wire over a full reciprocating step.

The wire contains for example plastic, carbon fibers, or metal alloys with one or more strands (cable). Monofilament hardened steel wire (piano wire) is particularly important. The steel wire used during lapping is coated with a nonferrous metal alloy, usually with a layer thickness of less than one micrometer, which derives as a lubricant from the wire drawing process and counteracts corrosion. The steel wire used during grinding is coated with a layer of synthetic resin or nickel, which acts as a binder for the fixed abrasives. In the case of grinding wire, the abrasives may also be fixed by a form fit, for example by rolling (pressing) the abrasive into the surface of the steel wire.

The abrasives used in the case of lapping comprise for example silicon carbide, boron carbide, boron nitride, silicon nitride, zirconium oxide, silicon dioxide, aluminum oxide, chromium oxide, titanium nitride, tungsten carbide, titanium carbide, vanadium carbide, diamond, sapphire and mixtures thereof. Silicon carbide is particularly important for lapping and diamond is particularly important for grinding.

The carrier liquid of the slurry comprises, for example, oil or glycol.

Slurry lapping and a device suitable therefor, for cutting semiconductor wafers, are described for example in EP 0 789 091 A2. Diamond wire grinding and a device suitable therefor, for cutting semiconductor wafers, are described for example in WO 2013/041140 A1.

An ingot has a start, an end and a middle. The ingot start refers to the axial region of the ingot close to the end surface of the ingot during wire sawing with a unidirectional longitudinal wire movement, in the vicinity of which end surface the wire engages with the ingot for the first time during its movement in the longitudinal wire direction; in the case of wire sawing with continual direction reversal of the longitudinal wire movement (reciprocating method), correspondingly the ingot start refers to the axial region of the ingot in the vicinity of the end surface, in the vicinity of which the wire engages with the ingot for the first time during its net movement over a full reciprocating step. The ingot end refers to the axial region in the vicinity of the end surface of the ingot on the opposite side from the ingot start, and the ingot middle refers to the region between the ingot start and the ingot end.

Correspondingly, the wire web also has a start, a middle and an end. The wire web start refers to the part whose wire sections cut through the ingot section at the ingot start; the wire web end refers to the part whose wire sections cut through the ingot end, and the wire web middle refers to the part whose wire sections cut through the ingot middle. In the course of its longitudinal wire movement in the case of unidirectional sawing, or in the course of its net movement when sawing with the reciprocating step method, the wire enters the wire web at the wire web start and emerges from the wire web at the wire web end.

Each kerf formed in the ingot by chip formation has a wire entry side and a wire exit side. The wire entry side refers to the side of the ingot in the longitudinal wire direction on which the wire enters the kerf during its longitudinal wire movement (unidirectional cut) or during its net wire movement (cutting with the reciprocating step method); the wire exit side refers to the side on which the wire emerges from the cutting kerf.

During the cutting process, the wire sections are subjected to a transverse deflection in the feed direction. This is also referred to as wire bending. The wire bending results from the prestress of the wire in the longitudinal wire direction and the elasticity of the wire, in response to a transverse wire force acting in the transverse wire direction in the feed direction. The transverse wire force in the feed direction is an essential part of the cutting process. Without this transverse wire force, the grain cannot penetrate into the workpiece, and no material erosion takes place. The transverse wire force in the feed direction is determined by the ratio of the material removal rate and the speed of the longitudinal wire movement.

The material removal rate refers to the volume of chips generated per unit time, which are released from the workpiece by the cutting process. For wire bending which is small compared with the free length of the individual wire sections between their bearing points on the two wire guide rollers tensioning the wire web, the wire bending is proportional to the ratio of the material removal rate and the longitudinal wire speed (linear range, Hooke's law). In this sense, only small wire bending occurs during the wire sawing.

Since the wire exhibits no wire bending before the cut-in, and finite wire bending during the cutting of the workpiece, at least in the cut-in region there is always a region in which the wire bending varies.

For example, the wire bending increases with an increasing engagement length, increasing speed of the feed of the workpiece onto the wire web (increasing material removal rate) and decreasing speed of longitudinal wire movement, and it decreases with decreasing engagement length, decreasing material removal rate and an increasing speed of the longitudinal wire movement.

Cut-in beam refers to a body which is fastened on the ingot at the cut-in position, so that during the cutting process the wire web initially engages with the cut-in beam and only engages with the ingot after at least partially cutting through the cut-in beam. The purpose of cut-in beams, in the case of cutting workpieces with an engagement length that varies with cut depth, is to minimize the variation of the engagement length at least in the cut-in region.

Known cut-in beams are distinguished in that the extent of the cut-in beams in the ingot advance direction is small compared with the ingot diameter.

JP2007-301688 A2 describes a wire sawing method in which a cut-in beam is used.

Many of said wafers cut from ingots by means of wire sawing are intended for particularly demanding applications which require a particularly high degree of planarity and parallelism of the front and back sides of the wafers.

Among persons skilled in the art of wire sawing, it is known that the sidewalls of the kerfs formed by the wire sections of the wire web in the ingot are usually not exactly flat. In particular, it is known that the wire sections initially cut into the ingot upon first contact with the lateral surface of the ingot (cut-in process) at axial ingot positions which differ slightly from those at which they continue with further cutting in the course of the further ingot feed onto the wire web. This leads to wafers which have relatively pronounced deviations from a desired perfect plane-parallelism of their front and back sides, particularly in the cut-in region. Such a deviation, in the same direction, of the front and back sides from planarity in the cut-in region may be referred to as a "cut-in wave".

Known cut-in beams are unsuitable for solving the problem of long-wavelength deviations of the front and back sides of the wafers obtained by cutting the ingot from the desired plane-parallelism with one another in the particularly critical cut-in region.

Irregular cut-in can lead to planarity deviations, not in the same direction, of the respective front and back sides of the cut wafers. In particular, under certain circumstances the wafers are thinner in the cut-in region than at other positions. This form of nonplanarity in the cut-in region of a wafer may be referred to as a "cut-in wedge".

SUMMARY

In an embodiment, the present invention provides a method for simultaneously cutting a multiplicity of wafers from a cylindrical workpiece having an axis and a notch applied parallel to the axis in a lateral surface of the workpiece including applying a cut-in beam on the workpiece where the cut-in beam has a head end and a foot end. The head end is inserted into the notch of the workpiece. The workpiece is held with a feed device so as to position an axis of the work piece parallel to the axes of cylindrical wire guide rollers of a wire saw. The cut-in beam is moved through a planar wire web, where the planar wire web has sections of wire arranged parallel to one another and perpendicular to the axes of the wire guide roller. The wire sections are moved the longitudinal wire direction in the presence of abrasives.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 6A-6C: Comparative example of the cutting profile with variable wire bending.

FIG. 7A-7D: Example according to the invention of the cutting profile through an ingot with a cut-in beam fitted into the notch and constant wire bending in the ingot.

FIG. 8: Example according to an embodiment of the invention of an ingot with a cut-in beam fitted into the notch.

FIG. 9: Example according to an embodiment of the invention of an ingot with a cut-in beam, which has cut-in grooves, fitted into the notch.

FIG. 13A-13C: Examples according to an embodiment of the invention of embodiments of a cut-in beam with a large extent in the ingot feed direction.

FIG. 14: Profiles of the wafer thickness in the cut-in region, in the other region along the wafer diagonal in the feed direction, the minimum wafer thickness in the wire entry region and in the wire exit region of greatest engagement length.

DETAILED DESCRIPTION OF THE DRAWINGS

Figure 1A:
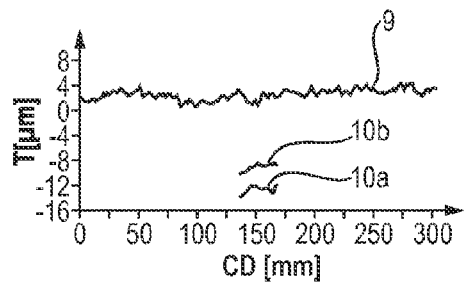
FIG. 1A-1B: Example according to an embodiment of the invention of the profile of the wafer thickness and of the wafer shape at the start of an ingot without a cut-in wedge and without a cut-in wave.

An aspect of the present invention is to provide a method for simultaneously cutting a multiplicity of wafers from a cylindrical workpiece, by which a high degree of planarity and parallelism of their respective front and back sides in the region of the cut-in is imparted to the wafers.

This is achieved by a method for simultaneously cutting a multiplicity of wafers from a cylindrical workpiece having an axis and a notch applied parallel to the axis in the lateral surface of the workpiece, comprising the application of a cut-in beam on the workpiece, the cut-in beam being fitted from a front side to a rear side with a form fit with a head end in the notch, and protruding out of the notch with a foot end; holding of the workpiece with its axis parallel to the axes of cylindrical wire guide rollers of a wire saw by means of a feed device of the wire saw; movement of the cut-in beam and of the workpiece by means of the feed device in a feed direction perpendicularly through a planar wire web consisting of sections, arranged parallel to one another and perpendicular to the axes of the wire guide rollers, of a wire which is guided multiple times in a spiral around the wire guide rollers by means of grooves in the wire guide rollers, the cut-in beam being moved first with the foot end, and the workpiece first with the notch, against the wire web; and movement of the wire sections in the longitudinal wire direction by rotation of the wire guide rollers in the same sense with the same circumferential speed in the presence of abrasives acting as a grinding agent.

The cut-in beam preferably has the shape of a circular cylinder or of a body with a length, height and width, the length being greater than the height and the height being equal to or greater than the width.

The length of the cut-in beam extends from a front side to a rear side, the height of the cut-in beam corresponds to the greatest vertical distance between the head end and the foot end, and the width of the cut-in beam corresponds to the greatest extent of the cut-in beam in the direction of the wire sections. The width of the cut-in beam is preferably equal to the width of the notch on the circumference of the workpiece.

The cut-in beam preferably has grooves which are arranged perpendicularly over the wire sections.

The height of the cut-in beam is constant between the front side and the rear side, or decreases from the front side to the rear side, so that the foot end protruding from the notch becomes shorter and shorter toward the rear side. Correspondingly, the wire sections penetrate commensurately later into the cut-in beam the longer the wire path between the wire sections and the start of the wire web is.

The shape of the cross section of the foot end in the feed direction may vary over the length of the cut-in beam. Preferably, it becomes increasingly wedge-shaped at the lower end of the foot end. The invention will be described below in a general form.

The cut-in beam is, for example, a body whose cross-sectional areas are respectively enclosed by two mutually parallel lines of a first length perpendicular to the workpiece axis, which lie mirror-symmetrically opposite one another, and two curves of a second and third length, the first length being greater than the second length and third length, and the first curve being the same for all cross-sectional areas. The first curve is a circle arc, the radius of which is the same as that of the notch, and the slope of which merges continuously into the slope of the two lines, and the cut-in beam is inserted into the notch of the workpiece with the part of its surface which contains the first curves of all cross-sectional areas of the cut-in beam.

The first length of the two mutually parallel lines may be constant from the start to the end of the cut-in beam. The cut-in beam is then a cylinder, and when the workpiece and the cut-in beam are fed onto the wire web of the wire saw, all wire sections of the wire web cut in simultaneously and along the lateral line of the cut-in beam which lies closest to the wire web in the feed direction.

The first length of the two mutually parallel lines may decrease from the ingot start to the ingot end. The cut-in beam is then an approximately wedge-shaped body, and when the workpiece is fed onto the wire web the cut-in beam is cut into first by the wire section which lies closest to the ingot start, subsequently successively and wire section by wire section by further wire sections along the lateral line which lies closest to the wire web in the feed direction, and finally by the wire section which lies closest to the ingot end.

Preferably, the first length decreases monotonically from the ingot start to the ingot end. Particularly preferably, the first length decreases strictly monotonically from the ingot start to the ingot end; the edge along which the wire sections of the wire web cut into the cut-in beam may, in particular, be a line.

The method is preferably carried out in such a way that, during the cutting of the overhang of the cut-in beam, i.e. the foot end protruding from the notch, bending of the wire web in the feed direction is set up and is kept constant during the cutting through the workpiece.

The cut-in beam may be adhesively bonded to the notch of the workpiece.

Preferably, the first length is in this case selected to be equal to the cutting depth by means of which wafers from previous cutting of a workpiece without a cut-in beam had a planarity deviation in the same direction of their front and back sides, i.e. suffered from a cut-in wave or a cut-in wedge.

The second curve, which is part of the edge line of a cross section of the cut-in beam perpendicularly to the longitudinal direction of the cut-in beam, may be subdivided into at least two sections, which are connected by a common vertex. The line in the surface of the cut-in beam in the longitudinal direction of the cut-in beam, which contains all points at which wire sections of the wire web cut into the cut-in beam, is then identical to the edge which is formed by the vertices of all cross sections of the cut-in beam perpendicularly to the workpiece axis.

The second curve of the cut-in beam may contain a line parallel to the wire web.

The second curve of the cut-in beam is preferably a circle arc, the slope of which merges constantly into the two parallel lines.

The material of the cut-in beam has a similar erosion behavior to the material of the workpiece.

The material of the cut-in beam is preferably glass, particularly preferably borosilicate glass, for example the glass marketed under the registered trademark DURAN.

The cut-in beam may be provided with grooves parallel to the wire sections of the wire web in its side facing toward the wire web, precisely one groove covering precisely one wire section with a distance in the feed direction. The grooves are formed in the part of the surface of the cut-in beam on which the cut-in takes place. The grooves in this case extend parallel to the wire sections which form the wire web of the cutting device. Preferably, the grooves are separated from one another in such a way that each groove covers precisely one wire section and each wire section covers precisely one groove with a distance in the direction in which the workpiece is moved onto the wire web when carrying out the cutting method. When the wire sections of the wire web cut into the cut-in beam, precisely one wire section thus comes to lie precisely in each groove.

The grooves may also be positioned in such a way that each plane in which the cutting kerf of a previous cutting process for cutting depths greater than the extent of cut-in wedges or cut-in waves of the wafers obtained in the previous cut extended respectively contains precisely one groove. The grooves are therefore arranged at positions which correspond to those of the wire sections of the wire web, which the wire sections occupy in their force-free equilibrium position in the workpiece axial direction during the continued cutting through the workpiece. Since these may differ from the positions at which the wire sections would cut into the workpiece without the cut-in beam, when using the grooved cut-in beam the wire sections are already forced when cutting into the cut-in beam into positions which correspond to the later axial force-free equilibrium position of the wire sections. A cut-in wave is thus avoided.

The method may be carried out with unidirectional longitudinal wire movement or with repeated continual reversal of the direction of the longitudinal wire movement (reciprocating step method).

The method may be lapping, in which the abrasives are supplied to the wire in a suspension.

The method may be grinding, in which the abrasives are fixed onto the surface of the wire.

The invention will be described in detail below with the aid of figures and references.

When cutting a cylindrical ingot by means of wire sawing, cylinder-like wafers are generally obtained, the front and back sides of which are arbitrarily curved independently of one another, i.e. in particular they do not extend exactly plane-parallel with respect to one another like the base and top surface of a cylinder. In the case of such wafers, however, the projection surfaces of their front and back sides when projected onto a common projection plane are still congruent, and the straight lines which extend through mutually corresponding points of the edge lines of the front and back sides extend parallel to one another, as in the case of a cylinder. Apart from a constant distance, cylinder-like wafers are therefore also fully described by their front and back sides.

The points of intersection of the front and back sides of a cylinder-like wafer with a straight line which extends parallel to the straight lines of the lateral surface may be referred to as mutually assigned points of the front and back sides. The relative spatial arrangement of the assigned points of the front and back sides can always be described as the sum of precisely one thickness-describing component and precisely one shape-describing component. This applies generally and without restrictions for all cylinder-like wafers.

The thickness-describing component comprises precisely the set of the sums of the distances from the points of intersection of each normal to a reference plane selected inside the wafer with the front and back sides of the wafer to this reference plane. The shape-describing component comprises precisely the set of the differences of the distances from the points of intersection of each normal to this reference plane with the front and back sides of the wafer to this reference plane.

A wafer of constant thickness but arbitrary shape therefore has constant sums of the distances from the points of intersection of each normal to the reference plane with the front and back sides to the reference plane, but an arbitrary set of the corresponding differences. Conversely, a wafer of arbitrary thickness but constant shape therefore has constant differences of the distances from the points of intersection of each normal to the reference plane with the front and rear sides to the reference plane, but an arbitrary set of the corresponding sums.

The surface which comprises the set of all points on the halves of the respective connecting lines of all pairs of mutually assigned points on the front and back sides may be referred to as the mid-surface of the front and back sides. The mid-surface of a wafer of arbitrary thickness but planar shape is always a plane. The mid-surface of a wafer of constant thickness but arbitrary shape is generally curved and precisely reflects the shape-describing component of the front and back sides.

In this context, the present invention is based on the observation that the general problem of an irregular cut-in breaks down into a thickness-describing component and a shape-describing component, and that these thickness-describing and shape-describing components have different causes, are consequently independent of one another and need to be resolved separately from one another by different measures. The thickness-describing component of the deviation from ideally plane-parallel front and back sides in the region of the cut-in may be referred to as a "cut-in wedge", and the shape-describing component of the deviation may be referred to as a "cut-in wave".

The terms "cut-in wedge" and "cut-in wave", as well as other typical geometrical defects of wire-sawed wafers, are illustrated in FIG. 5. FIG. 5 (A) schematically shows a wafer 1 cut by wire lapping with the reciprocating step method, having a notch 5 and almost perfect planarity and parallelism of all of its front and back sides. The mid-surface 8 between the front and back sides is consequently planar.

In order to estimate the overall wafer shape, it is sufficient to measure the thickness and shape along suitably selected measurement lines. A measurement across the entire surface area of the wafer is not necessary, particularly not in the case of wafers cut by the reciprocating step method, since owing to the continual direction reversal of the wire movement the thickness and shape profiles are approximately mirror-symmetrical with respect to the wafer diagonals in the feed direction, perpendicularly to which the longitudinal wire direction extends. Reference numeral 3 denotes the measurement line along the wafer diagonal in the feed direction; 4a and 4b denote measurement lines along chords, extending parallel to the diagonal in the feed direction, over the region of the wafer in which the engagement length of the wire with the ingot was longest during its cutting.

In the region of greatest engagement length, particularly thin cutting kerfs occur at the center of the ingot owing to depletion of the slurry causing the material removal during wire lapping, so that the wafers are thickest there. With a view to a wafer thickness which is as uniform as possible overall, this is compensated for by slower feeding of the ingot or by the use of longer wire lengths as a function of the feed distance in the region of the longest engagement lengths. Both measures widen the cutting kerf and therefore lead to smaller wafer thicknesses. Because of this, and owing to the slurry depletion in the direction of the longitudinal wire movement with the engagement length in the cutting kerf, the wafer is thinner on the wire entry side than the rest of the middle.

Owing to the continual reversion of the direction of wire motion in the reciprocating step method, a wafer which has been cut from a workpiece by the reciprocating method has two zones with reduced thickness in the region of the longest engagement length, namely a zone 2a more strongly reduced in thickness on the wire entry side as seen in the direction of the net wire movement, and a zone 2b less strongly reduced in thickness on the wire exit side as seen in the direction of the net wire movement.

Zone 2a is somewhat more strongly reduced in thickness than zone 2b, since the wire is subjected to a certain thickness reduction due to wear in the direction of the net movement of the wire during the wire lapping. Wire lapping with unidirectional longitudinal wire movement would only cause a thickness reduction on the wire entry side in the region of the longest engagement length. Owing to the wire thickness reduction due to wear, however, this would lead to a wafer thickness increasing overall strongly in the longitudinal wire movement direction. The thickness of a wafer cut by wire lapping with unidirectional wire movement therefore has a strongly wedge-shaped profile in the wire movement direction. Unidirectional cutting is therefore unsuitable for the production of wafers with a thickness which is as uniform as possible.

A wafer cut by wire grinding does not have zones 2a and 2b of reduced thickness in the region of the longest engagement length, since the abrasives causing the material erosion are fixed on the wire and are therefore not subject to depletion in the direction of the longitudinal wire movement.

FIG. 5 (B) schematically shows a wafer cut by wire lapping with the reciprocating step method, which in addition to the saddle-shaped thickness reduction 4a and 4b inherent to lapping has a thickness reduction in the cut-in region, the cut-in wedge 6. Since there is only a nonuniform thickness but not a nonuniform shape, the mid-surface 8 of such a wafer is planar.

FIG. 5 (C) schematically shows a wafer cut by wire lapping with the reciprocating step method, which has a curvature of its front and back sides in the same direction, the cut-in wave 7. Since the cut-in wave is a shape-describing geometrical defect, and except for the saddles 2a and 2b the wafer thickness is constant, the mid-surface 8 is curved parallel to the front and back sides in the cut-in region. Its profile accurately reflects the shape-describing component of the overall profile of the front and back sides.

FIG. 5 (D) finally schematically shows a wafer cut by wire lapping with the reciprocating step method, which has both a cut-in wedge 6 and a cut-in wave 7, which are superimposed on one another. The mid-surface 8 now contains both a thickness-describing component and a shape-describing component.

In this context, the invention was based in particular on the observation that wafers cut from an ingot by means of wire sawing may have a cut-in wedge but no cut-in wave, or no cut-in wedge but a cut-in wave. There are furthermore wafers which have both of these.

Figure 1B:
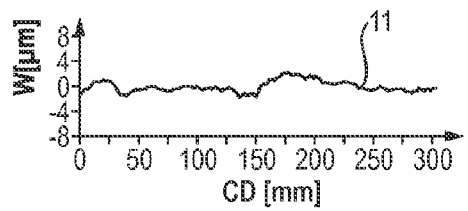

FIG. 1 (A) shows as a comparative example the profile 9 of the wafer thickness T in micrometers along the wafer diagonal in the ingot feed direction (measurement line 3 in FIG. 5 (A)) for a wafer from the ingot start, which was cut from a 300 mm silicon single crystal by a reciprocating step lapping method not according to the invention. The x axis denotes the cutting depth CD in millimeters.

The cut-in into the ingot is at 0 mm, and the exit at 300 mm. Curve 10a is the thickness profile on the wire entry side, in the direction of the net movement of the wire, along the short measurement line 4a (FIG. 5 (A)); curve 10b is the thickness profile on the wire exit side, in the direction of the net movement, along 4b (FIG. 5 (A)). Owing to the wire thickness reduction due to wear, the cutting kerf at the wire entry in the net wire movement direction is wider, and the wafer is thinner there (10a) than at the wire exit (10b).

FIG. 1 (B) shows the profile 11 of the wafer shape W (waviness) in micrometers along the diagonal in the ingot feed direction for the same wafer whose thickness profile is represented in FIG. 1 (A). The wafer does not have a cut-in wave.

The thickness profiles 9, 10a and 10b and the shape profile 11 ("waviness") were determined by a capacitive measurement method. The measurement probe comprises two electrodes, which lie opposite one another and between which the wafer is moved through, so that the probe pair moves along the desired measurement line on the wafer front and back sides at a distance. One electrode is arranged at a short distance above the front side of the wafer, and the other electrode is arranged at a short distance above the back side of the wafer. The electrodes respectively form a capacitor with the front and back sides of the wafer. The capacitances of these two capacitors are determined by means of an alternating electric field. The capacitance is precisely proportional inversely to the thickness of the air gap lying between each electrode and the wafer side facing it. The sum of the front-side and back-side air gap thicknesses determined in this way gives the wafer thickness to within a constant which is determined by the distance of the measurement electrodes from one another; the difference gives the wafer shape (waviness).

Figure 2A:
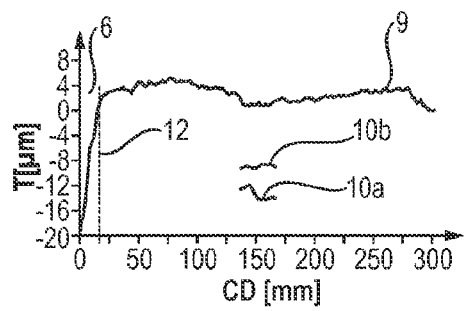
FIG. 2A-2B: Comparative example of the profile of the wafer thickness and of the wafer shape at the start of an ingot with a cut-in wedge.
Figure 2B:
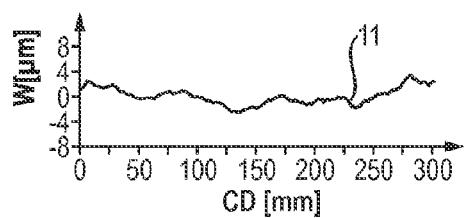

FIG. 2 (A) shows the thickness profile 9 of an ingot end-side wafer from the same ingot is that from which the ingot start-side wafer, the thickness and shape profiles of which are depicted in FIG. 1, is taken. A region 6 of greatly reduced wafer thickness, the cut-in wedge, can be seen clearly. The cut-in wedge reaches as far as a maximum cutting depth 12 of about 15 mm. It has been observed that the maximum cutting depth, up to which a cut-in wedge reaches, is always small compared with the overall cutting length of 300 mm (15 mm<<300 mm) FIG. 2 (B) shows the profile 11 of the shape (waviness) of this wafer. The ingot cut by the reciprocating step wire lapping method, the wafer thickness and shape of which are shown in FIG. 1 (A) and FIG. 2 (A), and respectively FIG. 1 (B) and FIG. 2 (B), therefore leads to wafers which have neither a cut-in wedge nor a cut-in wave at the ingot start, but at the ingot end have a pronounced cut-in wedge but still no cut-in wave.

Figure 3A:
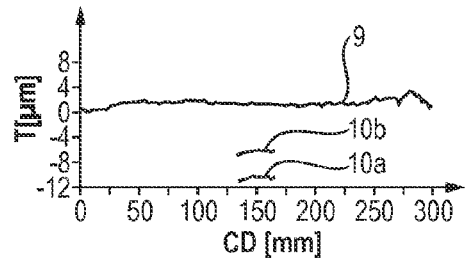
FIG. 3A-3B: Comparative example of the profile of the wafer thickness and of the wafer shape of an ingot with an cut-in wedge.
Figure 3B:
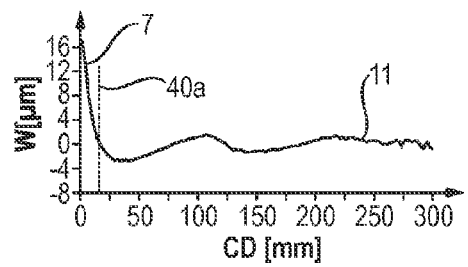

FIG. 3 (A) shows as a further comparative example the thickness profile 9 of a wafer from the start of a different ingot than that whose wafer thicknesses and shapes are depicted in FIG. 1 and FIG. 2. FIG. 3 (B) shows the shape profile 11 of the same wafer as that whose thickness profile is depicted in FIG. 3 (A). The wafer does not have a cut-in wedge, but it does have a cut-in wave 7, which extends to a cutting depth 40a of about 15 mm. In contrast to the wafer whose thickness and shape are shown in FIG. 2 (A) and FIG. 2 (B), and which has a cut-in wedge but no cut-in wave, the wafer whose thickness and shape are depicted in FIG. 3 (A) and FIG. 3 (B) therefore has no cut-in wedge but a pronounced cut-in wave.

Figure 4:
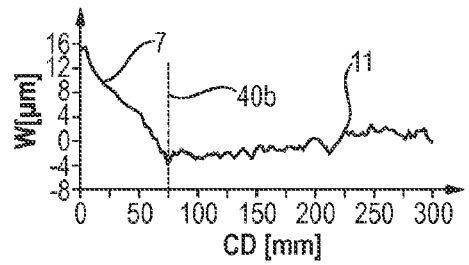
FIG. 4: Comparative example of the profile of the wafer shape of an ingot with an extended cut-in wave.

Lastly, FIG. 4 shows a final comparative example of a profile 11 of the shape W (waviness) of a different wafer from a different ingot cut by wire lapping with the reciprocating step method. This wafer has a pronounced cut-in wave 7, which extends as far as a very large cutting depth 40b of about 75 mm. It has been observed that, in contrast to cut-in wedges, cut-in waves can occur up to cutting depths which can no longer be considered to be very small compared with the overall cutting depth (here 300 mm) (75 mm<300 mm).

In summary, the following observations were thus made: in each ingot, there are wafers which have a cut-in wedge. The cut-in wedge is very small or even entirely zero at the ingot start; at the ingot end, however, it is always significantly pronounced. The minimum thickness in the cut-in region of a wafer with a cut-in wedge from the ingot end is often significantly less than the minimum thickness thereof at the wire exit in the region of the greatest wire engagement length, and is usually even less than the minimum thickness thereof in the wire entry in the region of the greatest wire engagement length.

At the ingot end, the cut-in wedge is therefore usually crucial for the minimum thickness of a wafer. Here, the cut-in wedge is thus particularly detrimental, because under certain circumstances too little material remains which could further be removed in the processing steps following the wire sawing, in order to correct the geometrical defects of the wafer after sawing, without thereby going below the predetermined target thickness of the fully processed wafer.

Figure 11:
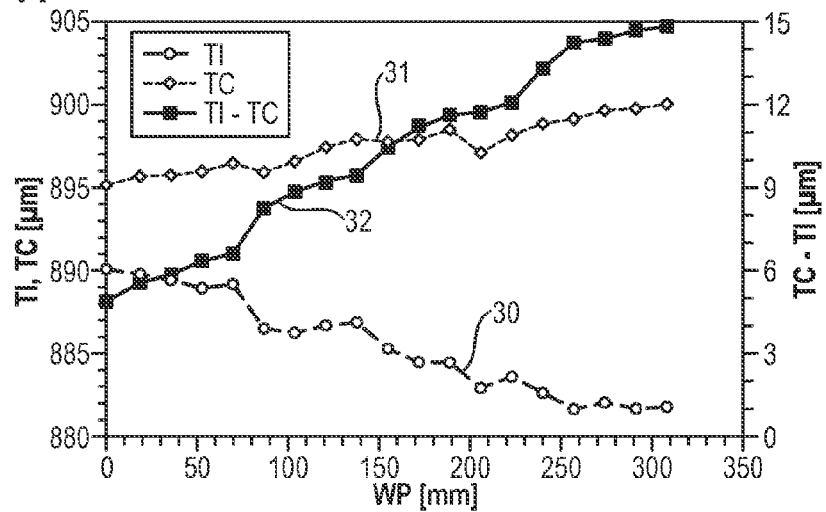
FIG. 11: Profile of the wafer thickness in the cut-in region and in the other region, as well as the difference between the two (cut-in wedge) as a function of the position of the wafer in the ingot.

This is confirmed by FIG. 11, which as a comparative example shows the profile 31 of the central thickness TC (thickness center) measured outside the cut-in wedge region, along the diagonal measurement line 3 (FIG. 5 (A)), the profile 30 of the cut-in wedge thickness TI (thickness in) and the difference 32 between the two curves (TC−TI). The x axis denotes the ingot position (workpiece position, WP) in millimeters. The ingot start lies at x=0 mm, and the ingot end at about x=310 mm. At the ingot end, the cut-in wedge dominates the overall thickness of the wafer by up to 15 µm.

A part of the invention is now based on the following consideration: the cut-in wedge must therefore be particularly pronounced at the ingot end, since the wire web at the start of cutting is provided with a virtually new (almost unworn) and therefore thicker wire, which leads to a small layer thickness in the cut-in region, because the surface of an unworn, fresh wire is smooth and thus cannot carry much slurry with it. Specifically, the wire on the wire web at cut-in has cut through the mounting beam in the previous cut. With a view to a short overall cutting time, this beam consists of an easily machinable material, for example carbon or mineral-filled plastic, when cutting through which the wire is therefore subjected to scarcely any wear and therefore almost still has its full diameter.

At the wire web start, i.e. where fresh wire is supplied directly from the feed spool, in the case of wire lapping the wire still carries its nonferrous metal coating that was applied in the wire drawing process as a solid-state "lubricant" to enable pulling the wire through the diameter-decreasing drawing dies. This is wetted less well by the slurry than bare steel wire. This was confirmed in wetting tests, in which sections of a steel wire still covered with nonferrous metal and of a bare steel wire were immersed in slurry and the amount of slurry adhering after removal was determined. The slurry film around the wire still covered with the nonferrous metal layer is consequently thin, and the cutting kerf is narrow. This is equivalent to the effect of the cutting kerf widening by the unworn wire, so that scarcely any cut-in wedge is usually formed on the ingot start side. The nonferrous metal coating of the wire is worn off after passing through a few cutting kerfs, because it is very thin and has low abrasion resistance. In the middle of the ingot, only bare steel wire, which is wetted well with slurry, therefore engages with the workpiece. A wider sawing kerf is therefore formed, and therefore a pronounced cut-in wedge develops beyond the middle of the ingot. By further roughening of the surface of the now bare steel wire, the slurry wetting is further improved toward the ingot end, so that the cut-in wedge is most strongly pronounced at the ingot end where the used wire eventually leaves the ingot.

The simultaneous thickness decrease of the wire due to wear cannot compensate for the cut-in wedge, since the thickness decrease affects the entire wafer and not only the cut-in region. The thickness increase of the wafers from the ingot start to the ingot end due to the thickness decrease of the sawing wire is compensated for by spacings of the wire guide grooves in the wire guide rollers decreasing continuously toward the wire web end, in order to obtain wafers with the same central thickness over all ingot positions.

FIG. 14 shows an example of profiles of the cut-in wedge of wafers which were cut by wire lapping according to the invention from a circular-cylindrical silicon ingot, as a function of the axial workpiece position WP from which the wafers measured were taken. In detail, the profile 30 of the smallest wafer thickness in the cut-in wedge TI (thickness in), the profile 31 of the central wafer thickness TC (thickness center) along the wafer-diagonal measurement line 3 (FIG. 5 (A)) outside the cut-in wedge, the profile 38 of the minimum wafer thickness TX on the wire exit side (thickness eXit) in the region of greatest engagement length, which was measured along measurement line 4*b* (FIG. 5(A)), and the profile 39 of the minimum wafer thickness TE on the wire entry side (thickness entry) in the region of greatest engagement length, which was measured along measurement line 4*a* (FIG. 5(A)), are depicted. For all ingot positions, and particularly at the ingot end, the minimum wafer thickness associated with the cut-in wedge is greater than that associated with the region of the wire entry in the region of greatest engagement length, and even greater than that associated with the region of the wire exit in the region of greatest engagement length.

The tests and observations on which the invention is based furthermore led to the proposal to eliminate the cut-in wedge increasing from the ingot start to the ingot end by stronger "prewearing" of the wire sections on the web start side compared with the wire sections on the web end side, by the cutting into the cut-in beam first taking place for the wire sections on the web start side and lastly for the wire sections on the web end side, specifically without tilting the workpiece against the wire web or using conical wire guide rollers.

Figure 15A:
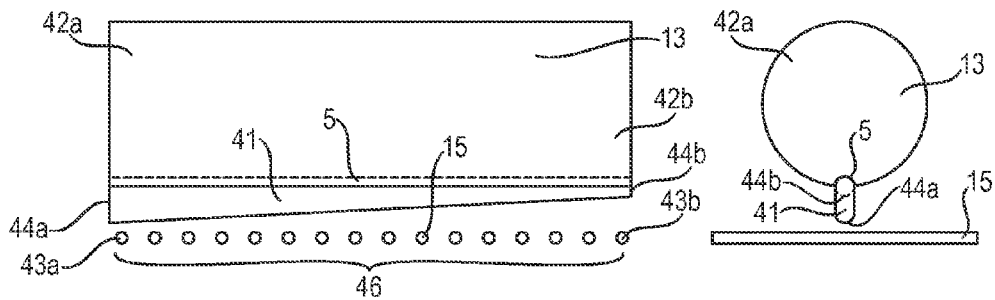
FIG. 15A-15C: Sectional profile through an ingot with a cut-in beam, the extent of which decreases strictly monotonically in the ingot feed direction from the ingot start to the ingot end.
Figure 15B:
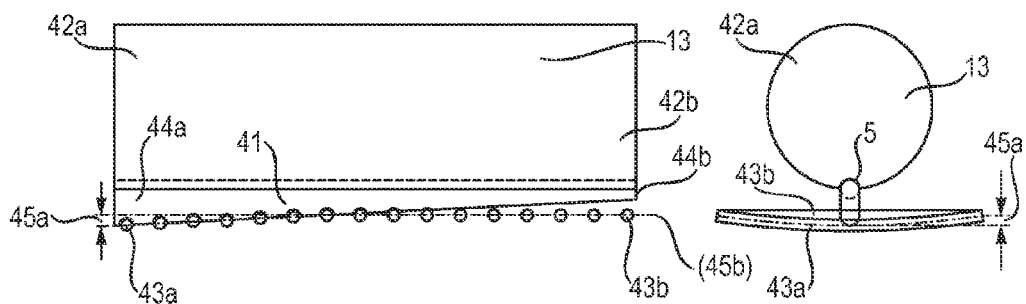
Figure 15C:
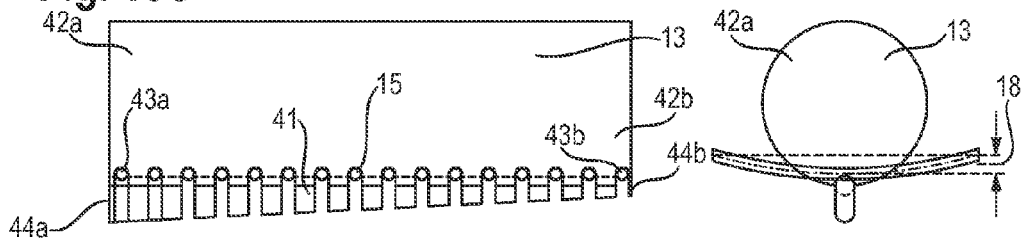

The solution was found in the form of a wedge-shaped cut-in beam. This is illustrated in FIG. 15. FIG. 15(A) to FIG. 15(C) show the cutting profile through an ingot with a cut-in beam whose extent decreases continuously in the ingot feed direction, i.e. its height from the start to the end of the ingot, i.e. between the front side and rear side of the cut-in beam, or its length. FIG. 15(A) shows in side view (left half) and in a view of the ingot end surface (right half) the arrangement before the cut-in with the wire 15 of the wire web with a wire web start 43*a* and a wire web end 43*b*, an ingot start 42*a* and an ingot end 42*b*, and a wedge-shaped cut-in beam 41, the extent of which in the feed direction at the cut-in beam start 44*a* assigned to the ingot start 42*a* is greater than its extent in the feed direction at the end 44*b* assigned to the ingot end 42*b*. The cut-in beam 41 is inserted with a form fit into the notch 5 of the ingot 13, or adhesively bonded there.

Figure 5A:
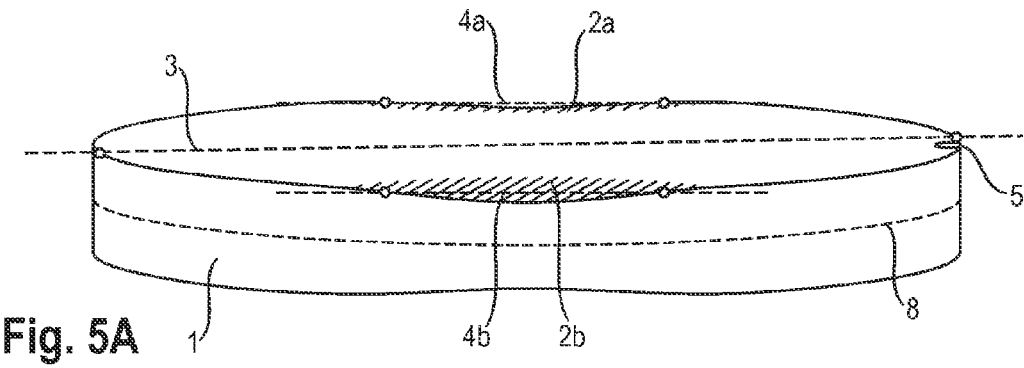
FIG. 5A-5D: Comparative examples of wafers with a saddle-shaped thickness, cut-in wedge or cut-in wave.
Figure 5B:
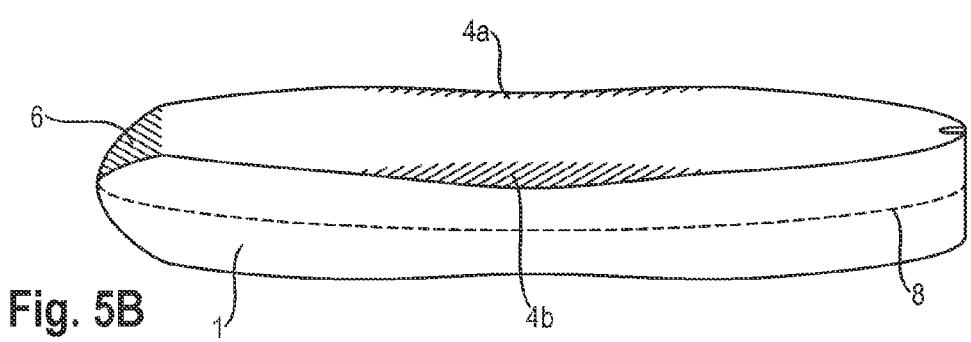
Figure 5C:
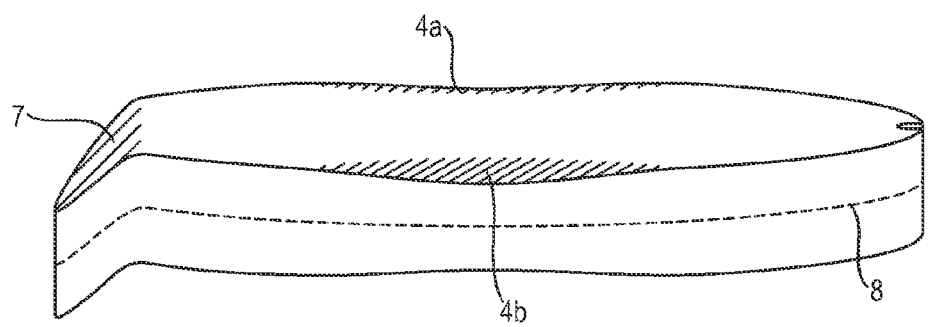
Figure 5D:
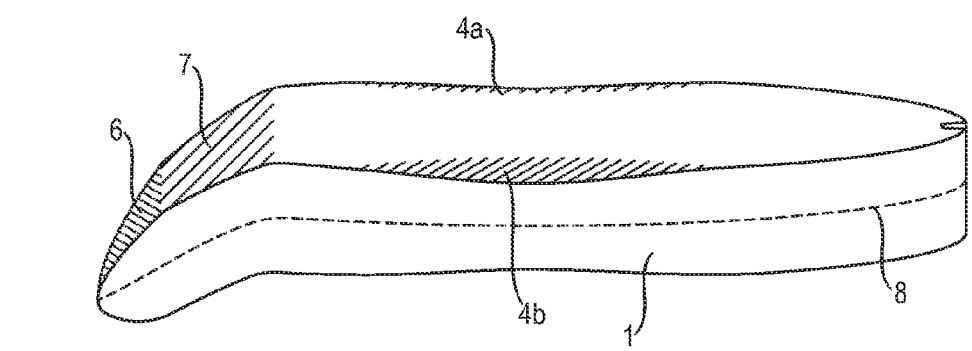

When the ingot and cut-in beam are fed onto the wire web, the wire sections placed at the wire web start 43*a* cut first into the wedge-shaped cut-in beam protruding furthest there (44*a*) out of the notch in the feed direction. This is shown by FIG. 5(B). Owing to the cutting action carried out and further feeding of the ingot onto the wire web, the wire sections cutting in on the ingot start side experience wire bending 45*a* in the feed direction. This wire bending is at first necessarily variable, since it varies from zero (before the cut-in) to a finite value (cutting process). With further feeding, all further wire sections successively cut into the wedge-shaped cut-in beam 41.

Preferably, the feed speed during the cutting of the cut-in beam is selected in such a way that all wire sections have all reached constant wire bending 18 at the latest at the end of the cutting of the cut-in beam, before the wire sections cut into the ingot 13. This can then be kept constant according to the invention throughout the cutting through the ingot. This is shown by FIG. 15(C).

With such an approximately wedge-shaped cut-in beam, the cut-in wedge can be eliminated fully and over the entire length of the ingot for all wafers. It has been observed that the wear, and therefore the thickness decrease, of the wire takes place constantly, but not necessarily proportionally to the sum of all engagement lengths through which the wire passes. It is therefore particularly preferable to select the extent of the cut-in beam in the direction of the movement of the workpiece onto the wire web as a function of the axial workpiece position, in such a way that the cut-in wedge is in fact eliminated for each workpiece position.

The precise cut-in beam shape necessary for this can be determined rapidly by test cuts and measurements of the remaining cutting wedge of the wafers obtained: if a wafer at an axial position of the workpiece still has a cut-in wedge from a test cut, the extent of the cut-in beam is increased at the corresponding longitudinal position of the cut-in beam in the direction of the movement of the workpiece onto the wire web in the subsequent cut; if the cut-in wedge has not only been eliminated, but the wafer even has an increased thickness in its cut-in region, the extent of the cut-in beam at the corresponding position is reduced in the subsequent cut.

It is likewise possible to make the extent of the cut-in beam in the direction of the movement of the workpiece onto the wire web constant over the entire length of the cut-in beam, and instead to reduce the size of the cross-sectional area of the cut-in beam from the workpiece start to the workpiece end. To this end, it is usually sufficient for the part of the cut-in beam which is closest to the wire web to be tapered from the start to the end. For example, the cut-in beam may be made from a readily available cuboid body, for example a beam of flat glass, one narrow longitudinal side of which is rounded according to the contour of the notch of the workpiece, and the other narrow longitudinal side of which is not processed on the ingot start side and is ground increasingly in a wedge shape toward the ingot end, so that the wire of the wire web cuts in on the ingot start side along a line parallel to the longitudinal wire direction and on the ingot end side into a wedge pointing with its tip toward the wire web.

Figure 16:
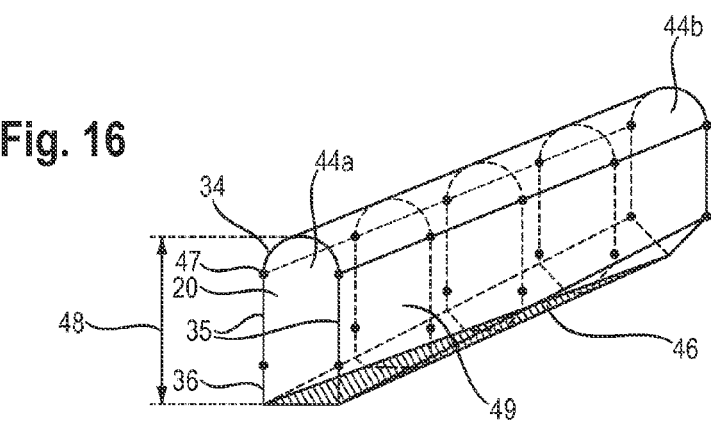
FIG. 16: An example of a cut-in beam according to an embodiment of the invention.

FIG. 16 shows an example of a cut-in beam 20 according to the invention with a constant extent 48 in the direction of movement of the workpiece onto the wire web. The first curve 34, the second and third line 35, and the second curve 36 bound each cross section 49 perpendicularly to the longitudinal direction of the cut-in beam. In the schematic representation of FIG. 16, end points 47 mark the respective transitions of the curves 34 and 36 and lines 35. The cut-in beam is inserted with a form fit or adhesively bonded into the notch of the workpiece along the part of the surface of the beam which contains the first curves 34 of all cross sections 49 perpendicular to the longitudinal direction of the cut-in beam. According to the invention, the first curves 34 of all cross sections are the same. In the example shown in FIG. 16, the length of the lines 35 is furthermore also equal for all cross sections 49; only the second curve 36 changes its length and shape from the start 44*a* to the end 44*b* of the cut-in beam 20.

Owing to the constant extent 48 of the cut-in beam in the direction of the movement of the workpiece onto the wire web, all sections of the wire web cut simultaneously into the side surface 46 (represented by shading in FIG. 16). Owing to the length of the second curve 36 decreasing from the start 44*a* to the end 44*b* of the cut-in beam, however, the engagement lengths of the wire sections of the wire web with the cut-in beam decrease from the start 44*a* to the end 44*b* of the cut-in beam. During the cut-in and further cutting through at least the cut-in beam part bounded by the second curves 36, the individual wire sections of the wire web are subjected to wear decreasing from the start 44*a* to the end 44*b* of the cut-in beam, and consequently a decreasing thickness reduction. The cut-in regions of the cut wafers are thus relatively thicker from the ingot start to the ingot end. Compared with cutting into a workpiece without a cut-in beam fitted, or a workpiece fitted with a cut-in beam of constant cross section, the cut-in thicknesses thus increase and the cut-in wedges, which increase from the ingot start to the ingot end, are compensated along the entire length of the ingot.

While a cut-in wedge always occurs at least on the ingot end side, a cut-in wave may occur at any ingot position, or there may be no cut-in wave at all. The cause of a cut-in wave is assumed to be the abrupt mechanical or thermal load change at the moment of cut-in. Mechanical causes may for example be settling movements of the ingot in the ingot suspension and the feed device, or changes in the magnitude and direction of the tension which the tensioned wire exerts between the wire guide rollers, changes of which can cause movements in the bearings of the wire guide rollers. Thermal causes are, for example, relative movements between the ingot and the wire web owing to nonuniform thermal expansion of individual components (ingot, wire guide roller, feed device, machine frame), which can be compensated for only poorly by cooling owing to poor thermal conduction (for example expansion of the plastic coating of the wire guide rollers into which the grooves are milled).

It has been observed that the occurrence of cut-in waves increases with the service life of the grooving in the coating of a set of wire guide rollers. In the event of excessively frequent or pronounced occurrence of cut-in waves, it is then necessary to remove the wire guide rollers, grind down the worn grooving, apply new grooving, and reinstall the wire guide rollers into the sawing device. Often, in this case, when measuring the grooving used, no shape deviation can be found, i.e. there is less wear due to abrasion and more wear due to modification of the properties of the grooves and coating, for example by the coating absorbing glycol or oil of the slurry carrier liquid, which alter the elastic properties and make them nonuniform over the length of the wire guide rollers, or which alter the thermal conductivity and expansion of the coating.

Said effects lead to the wire sections of the wire web initially cutting into the ingot at an axial position of the ingot which differs from that which is set after a mechanical and thermal equilibrium has been set up in the further course of the cutting process. This applies for ingots with any cross sections, and in particular those with a constant engagement length throughout the cutting (cuboids). In the case of a nonrectangular polygonal or circular cross section, the engagement length varies continuously, and an equilibrium is not set up throughout the cutting; nevertheless, the change is then always constant and can be compensated for well by measures known in the prior art, for example cooling of the ingot, of system components—in particular the wire guide rollers—and the like.

If an ingot delivers wafers with a cut-in wave, the wafers with the strongest cut-in wave may lie at the ingot start, at the ingot end, or in the middle of the ingot. A cut-in wave may reach up to a maximum cutting depth which is small compared with the overall cutting length; in the case of a 300 mm circular-cylindrical ingot, about 15 mm. It may, however, also reach up to a maximum cutting depth which is no longer small compared with the overall cutting length; in the case of a 300 mm circular-cylindrical ingot, 75 mm or even more.

In particular, it has been observed that both a cut-in wedge and a cut-in wave of wafers from neighboring axial positions of the ingot from which they were cut have only small differences in relation to the shape and size of the cut-in wedge or cut-in wave, and the differences become commensurately greater when their axial positions in the ingot from which they were cut lie further away from one another.

Figure 12:
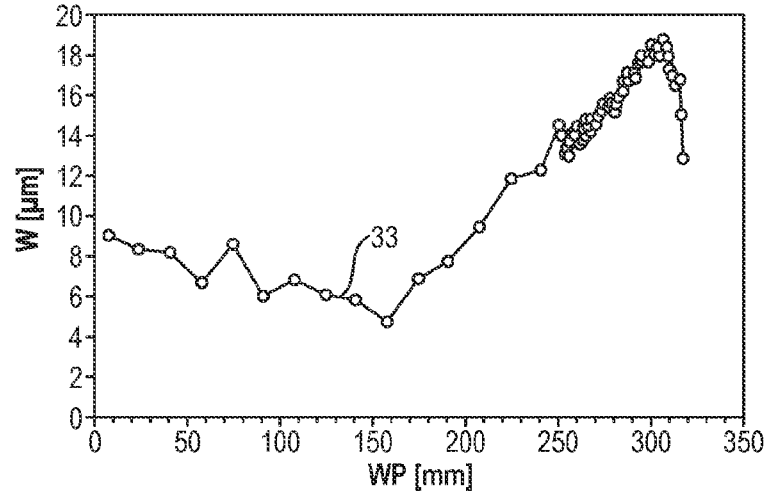
FIG. 12: Profile of the cut-in wave as a function of the position of the wafer in the ingot.

FIG. 12 shows as a comparative example the profile 33 of a cut-in wave W as a function of the ingot length WP. In the comparative example selected, the cut-in wave is present at the ingot start, is minimal in the middle of the ingot and is maximum at the ingot end. There is likewise a multiplicity of comparative examples in which a cut-in wave is most pronounced at the ingot start or in the middle of the ingot. A feature common to all observations is, however, that both a cut-in wave, if there is one, or a cut-in wedge, which always occurs at least on the ingot end side, changes only slightly between neighboring wafers. Cut-in waves and wedges are thus always long-range correlated over the longitudinal ingot position; a cut-in wave or a cut-in wedge never occurs on one wafer and not on a neighboring wafer.

In the method according to the invention, the ingot is now mounted on the mounting beam in such a way that its notch faces toward the wire web and the cut-in beam is inserted with a form fit into the notch of the workpiece. The cut-in beam should consist of a material which has a behavior of material removal similar to the material of the workpiece. For the application in which a silicon ingot is intended to be cut, cut-in beams made of glass have been found to be advantageous. Glass has a similar material removal behavior to silicon. It has been found that a similar material removal behavior is one with which similar material removal conditions occur.

The method according to the invention has many advantages: the form fit of the cut-in beam with the notch leads to good dissipation of the high shear forces acting in the workpiece when the many wire sections cut into the cut-in beam. The bond between the cut-in beam and the workpiece can thus be produced with an adhesive which needs to have only little adhesion (surface bonding) on workpiece and cut-in beam surfaces and low cohesion (adhesive material holding force), or does not need to fully cover the interface between the workpiece and the cut-in beam (point bonding). The adhesive can therefore be from a very wide selection of available adhesives, and the adhesive bonding may in particular be carried out only on part of the surface.

It is particularly advantageous to use an anaerobically curing adhesive, with which the notch can be coated without observing a pot life, and which, owing to good capillary behavior when the cut-in beam is put in, runs particularly thinly and over the full surface in the adhesive joint and then cures very rapidly in the absence of air. UV-curing adhesives are also particularly suitable when the cut-in beam is selected to be made of a UV-transparent material, for example UV-transparent glass.

Since in the method according to the invention the bonding surface is small and the form fit of the cut-in beam and the notch is good, a large amount of adhesive is furthermore saved on and the manufacturing costs are thereby reduced.

The adhesive is preferably formulated so as to be slightly soluble. In the case of wire lapping with glycol slurry, it may even be glycol-soluble, since owing to the small kerf width during the cutting of the cut-in beam, no significant release of the adhesive bond takes place. After the cut-in beam has been cut through, glycol also reaches the adhesive joint, which still holds the resulting thin lamellae of cut-in beam material connected to the workpiece, on both front sides through the resulting cutting kerf. Since the cut-in beam is already cut through at this time, the remnants of it can fall off by release of the adhesive bond without, for example, being able to damage the wire web. With a cut-in beam adhesively bonded externally on the lateral surface, this is not possible.

The slight solubility of the adhesive also simplifies the uncementing which follows the cutting (time-saving, non-critical solvent, short action times, low temperatures). Owing to the good form fit of the cut-in beam and the workpiece, the adhesive film is furthermore so thin that, after the uncementing, adhesive residues possibly still adhering do not interfere with subsequent edge rounding of the wafers obtained.

In order to achieve good uncementing properties, the adhesive may contain conventional separating auxiliaries.

The method according to the invention furthermore has the following advantage: particularly in the case of semiconductor wafers, a workpiece identifier, for example in the form of laser scribing, is applied after the cutting, in the vicinity of the notch. Since the workpiece is first moved with the notch against the wire web, cut-in wedges and cut-in waves occur in a region which is in any case provided for the workpiece identifier. This identifier region is excluded from the evaluation of the wafer planarity.

A cut-in wave, if there is one, is often effective for the geometry of the wafers obtained to a significantly larger cutting depth. This is because the restoring forces in the axial ingot direction, owing to the deflection of the wire sections at cut-in, are very small compared with the axial force-free equilibrium position in the further course of the cutting. Furthermore, in the case of ingots with a nonrectangular polygonal or circular cross section, the engagement length varying constantly under the cut leads to continuously varying axial force-free equilibrium positions which the wire "lags behind" over large cutting depths.

The method according to the invention makes it possible to use a cut-in beam with a very large extent in the feed direction (height), in order also to be able to compensate for very long-wavelength cut-in waves. Owing to the good form fit, the extent of the cut-in beam in the longitudinal wire direction (width) is small, so that despite the large extent in the feed direction the cutting takes place very rapidly with little wire consumption and overall very economically.

During the engagement, the engagement length varies from a zero value to a finite value. In the case of workpieces with a circular cross section, or a cross section whose edge has at least one vertex and when this vertex points toward the wire web in the feed direction, the variation takes place constantly. With a varying engagement length, the wire bending also always varies.

FIG. 6 schematically shows as a comparative example the cutting process of a circular-cylindrical ingot for a method not according to the invention without a cut-in beam in the notch. Before cut-in and at the moment of cut-in, the bending of the wire 15 is zero (FIG. 5 (A)). During the cut-in phase, the wire bending has a variable magnitude 16. Reference numeral 17 denotes the part of the ingot already cut through in FIG. 6. Only with a finite cutting depth can constant wire bending 18 be achieved by known measures, such as altering the feed speed or the longitudinal wire speed (FIG. 6 (C)).

It has now been found that a cutting method delivers wafers with particularly planar and mutually parallel front and back sides when the wire bending in the feed direction is kept constant. This has been found to be particularly advantageous for workpieces with an engagement length constantly varying as a function of the cutting depth. With the method according to the invention it is possible to displace the transition from the always zero wire bending at cut-in to wire bending which is necessarily finite for a continued cutting process into the cut-in beam and then keep it constant over the part of the overall cutting process taking place in the workpiece.

FIG. 7 schematically shows an example of a cutting method according to the invention. The ingot 13 faces the wire 15 with its notch 5, and a cut-in beam 14—which is circular-cylindrical in the example shown—is inserted or adhesively bonded into the notch (FIG. 7 (A)). The cut-in beam 14 protrudes from the notch beyond the envelope of the lateral surface of the workpiece, which is circular-cylindrical in the example, so that the wire 15 first cuts into the cut-in beam 14 (FIG. 7 (B)). The ingot is now fed onto the wire web in such a way that the always unavoidable variable wire bending occurs while the wire cuts through the protruding part of the cut-in beam. Reference numeral 19 denotes the part of the cut-in beam already cut through (FIG. 7 (B)). As soon as the wire begins to cut into the workpiece 13, the wire bending 18 then reached is kept constant by known measures (FIG. 7 (C)) and remains constant over all of the further cutting process (18 in FIG. 7 (D)).

Figure 10:
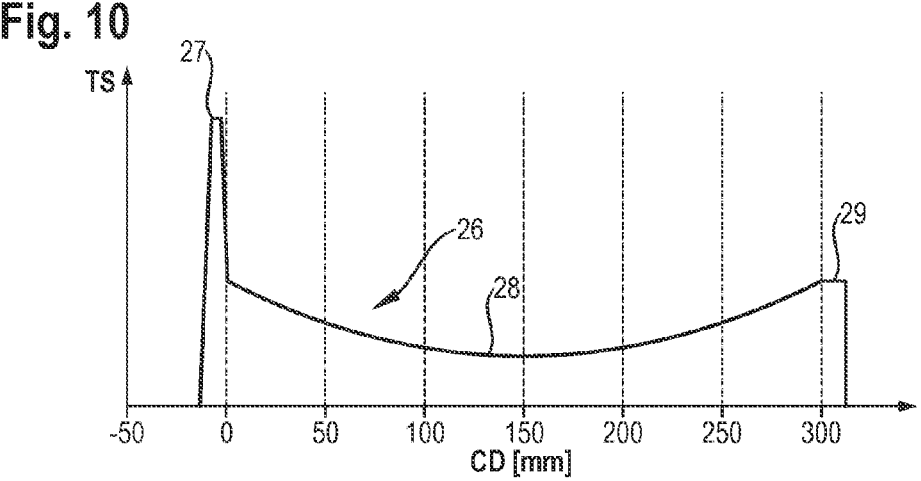
FIG. 10: Example according to an embodiment of the invention of the profile of the feed speed as a function of the cutting depth.

FIG. 10 shows an example of a selection according to the invention of the profile 26 of the feed speed of the workpiece onto the wire web and through the latter, with which the wire bending can be kept constant throughout the cutting operation through the workpiece, with reference to the example of cutting a circular-cylindrical workpiece as in FIG. 7. The x axis denotes the cutting depth CD in millimeters. The wire cuts through the cut-in beam according to the invention for values of CD<0, and at CD=0 comes in contact with the workpiece for the first time. The workpiece has a diameter of 300 mm. The cutting through the workpiece is therefore completed at CD=300 mm, and for CD>300 mm the wire cuts into the mounting beam mounted on the ingot side facing away from the wire web. The y axis denotes the feed speed TS in units of speed, for example millimeters per minute.

While the cut-in beam is being cut through, a very high feed speed 27 is selected, which deflects the wire within a few millimeters of ingot feed to the desired target bending. For the further cutting, the feed speed is varied inversely proportionally to the engagement length. In the case of a circular-cylindrical workpiece, for example a silicon ingot, the feed speed reaches a minimum 28 at maximum engagement length, when the ingot is precisely half cut through (CD=150 mm). For CD>150 mm, the engagement length then decreases again and the selected feed speed correspondingly increases again. When the mounting beam is reached (CD=300 mm) feed may for example be carried out constantly until the final end of the cut (29). This does not influence the wire bending taking place in the workpiece. In a similar way, but with the reciprocal values of FIG. 10, for example the length of wire running through the workpiece according to the feed carried out could also be selected by means of a large difference between the two longitudinal wire lengths of the reciprocating step (reciprocating step method) or large longitudinal wire speed (unidirectional cut), i.e. large net movement of the wire or high speed of the longitudinal wire movement for large engagement lengths.

FIG. 8 shows an example according to the invention, in which a cut-in beam that is suitable for avoiding particularly pronounced cut-in waves determining the geometry of the wafers obtained up to large cutting depths is used. The cut-in beam 20 has a maximum extent in the feed direction 22, which is greater than or equal to the cutting depth 21 to which a cut-in wave (or cut-in wedge) was observed in previous cutting of a test ingot. The feed speed or wire length, or speed of the longitudinal wire movement, are selected in such a way that variable wire bending 16 preferably takes place early during the cutting through the cut-in beam.

Since the cut-in beam 20 has an extent 22 in the feed direction which is large compared to the length of the edge curve of the circle segment 34 by which the cut-in beam is connected with a form fit to the notch 3 of the workpiece 13, which is circular-cylindrical in the example shown, high transverse forces occur despite the good form fit and the cut-in beam is adhesively bonded to the notch along an adhesive joint 23.

FIG. 13 shows further embodiments of the cut-in beam 20, the use of which is particularly suitable for eliminating cut-in waves (or cut-in wedges) extending to large cutting depths. They have a cross section which is enclosed by two equal lines 35 of a first length, lying mirror-symmetrically and parallel opposite one another, a first curve 34 of a second length, and a second curve 36 of a third length, the first length being greater than the second or third length. The first curve 36 is a circle arc, along which the cut-in beam is connected to the notch of the workpiece with a form fit and by means of an adhesive joint 23, the radius of which is the same as that of the notch and the slope of which respectively merges constantly into the slope of the lines 35 lying opposite one another. The second curve 36, via which the wire cuts into the cut-in beam, may likewise be a circle arc (FIG. 13 (A)), subdivided into further curves in order to form a vertex which points (FIG. 13 (B)) in the feed direction, or a line which is oriented parallel to the wire web.

For the exemplary embodiments of FIG. 13 (A) and FIG. 13 (B), at cut-in there is a constant variation of the engagement length, and for FIG. 13 (C) there is a non-constant variation.

A cut-in beam with a shape which is shown by way of example in FIG. 13 has the advantage that its extent in the longitudinal direction of the wire sections of the wire web, i.e. its width, is very small. In this way, the engagement lengths are very short and therefore the material removal rates also remain small even with rapid feeding onto the wire web. Regardless of a large length of the cut-in beam in the feed direction, it is thus possible to cut very rapidly so that the total time of the cutting process for the cut-in beam and workpiece is not much greater than for cutting the workpiece on its own.

A cut-in beam which is shown by way of example in FIG. 13 requires very little material and can be produced economically. It essentially has the shape of a glass beam, which is cut, for example broken, from a readily available and economical flat material (flat glass), and only needs to be processed by shaping, for example by grinding, slightly along the part of the lateral surface which enters into the form fit with the notch of the workpiece.

A cut-in beam having cross sections as shown in FIG. 7 or FIG. 8, or FIG. 13, preferably additionally has grooves in the curve 36 of its edge which faces toward the wire web and in which the cut-in takes place. The grooves extend parallel to the wire sections of the wire web so that, with a suitable axial orientation of the workpiece in the feed device, precisely one groove respectively covers precisely one wire section at a distance in the feed direction.

When the workpiece is being fed onto the wire web, precisely one respective wire section then comes to lie firstly in precisely one groove, and the grooves guide the wire sections in such a way that they cut into the cut-in beam without deflection in the axial ingot direction. If it has been found in previous test cuts that, for example, the coating of the wire guide rollers, in which the grooves that guide the wire are milled, shift by thermal expansion in the axial direction of the wire guide rollers relative to the positions of the bearings in which the wire guide rollers are rotationally mounted, the spacings of the grooves 24 in the cut-in beam 20 may also be provided in such a way that, after thermal position displacement of the grooves has taken place in the wire guide rollers, the grooves 24 of the cut-in beam cover the wire sections of the wire web at a distance in the feed direction.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOL LIST 1 wafer;
2*a* wire-entry-side, saddle-shaped, reduced wafer thickness in the region of the greatest wire engagement length;
2*b* wire-exit-side, saddle-shaped, reduced wafer thickness in the region of the greatest wire engagement length;
3 measurement length of the diagonal thickness and shape profile;
4*a* measurement chord of the wire entry-side thickness and shape profile;
4*b* measurement chord of the wire exit-side thickness and shape profile;
5 notch;
6 cut-in wedge;
7 cut-in wave;
8 mid-surface between front and back sides of a wafer;
9 profile of the wafer thickness along the wafer diagonals;
10*a* profile of the wafer thickness along the wire-entry-side measurement chord in the region of longest wire engagement length;
10*b* profile of the wafer thickness along the wire-exit-side measurement chord in the region of longest wire engagement length;
11 profile of the wafer shape along the wafer diagonals;
12 cutting depth up to which the wafer can have a cut-in wedge;
13 ingot;
14 circular-cylindrical cut-in beam;
15 wire;
16 variable wire bending;
17 ingot part cut through;
18 constant wire bending;
19 cut-in beam part cut through;
20 cylindrical cut-in beam with large extent in the feed direction;
21 cutting depth up to which the wafer can have a cut-in wedge or a cut-in wave;
22 longest extent of the cut-in beam with large extent in the feed direction (height of the cut-in beam foot end protruding from the notch);
23 adhesive joint;
24 grooves;
26 profile of the feed speed;
27 very high feed speed in the region of the cut-in beam;
28 low, engagement length-dependent feed speed in the region of the ingot;
29 feed speed in the region of the ingot mounting beam;
30 profile of the smallest wafer thickness in the cut-in region as a function of the position of the wafer in the ingot;
31 profile of the central wafer thickness outside the cut-in region as a function of the position of the wafer in the ingot;
32 profile of the difference between the central wafer thickness outside the cut-in region and the smallest thickness in the cut-in region as a function of the position of the wafer in the ingot ("cut-in wedge");
33 profile of the cut-in wave as a function of the position of the wafer in the ingot;
34 first cut-in beam curve, connected with a form fit to the notch of the wafer;
35 pair of equally long lines, of a respective first length of the cut-in beam, lying mirror-symmetrically opposite one another;
36 second curve of the cut-in beam;
38 profile of the minimum wafer thickness on the wire exit side in the region of the greatest wire engagement length as a function of the position of the wafer in the ingot;
39 profile of the minimum wafer thickness on the wire entry side in the region of the greatest wire engagement length as a function of the position of the wafer in the ingot;
40a smallest cutting depth down to which the wafer can have a cut-in wave;
40b greatest cutting depth up to which the wafer can have a cut-in wave;
41 cut-in beam, the extent of which in the ingot feed direction decreases from the ingot start to the ingot end;
42a ingot start;
42b ingot end;
43a web start (first wire section in the sawing web);
43b web end (last wire section in the sawing web);
44a start of a cut-in beam (front side), the extent of which beam decreases in the ingot feed direction from the ingot start to the ingot end;
44b end of a cut-in beam (rear side), the extent of which beam decreases in the ingot feed direction from the ingot start to the ingot end;
45a variable wire bending at the wire web start when cutting a cut-in beam, the extent of which the beam decreases in the ingot feed direction from the ingot start to the ingot end;
45b variable wire bending at the wire web end when cutting a cut-in beam, the extent of which the beam decreases in the ingot feed direction from the ingot start to the ingot end;
46 side surface of the cut-in beam into which the wire web cuts;
47 end point;
48 constant extent of a cut-in beam in the direction of the movement of the workpiece onto the wire web;
49 cross section of the cut-in beam perpendicularly to the longitudinal direction of the cut-in beam;
CD cutting depth (cutting depth in the feed direction of the ingot; CD);
T thickness (T);
TE wire entry-side minimum thickness in the region of greatest engagement length (thickness entry, TE);
TS speed of the feed (table speed, TS);
TX wire exit-side minimum thickness in the region of greatest engagement length (thickness exit, TX)
W shape (waviness, W);
WP position of the wafer in the ingot (wafer position, WP).

What is claimed is:

1. A method for simultaneously cutting a multiplicity of wafers from a cylindrical workpiece having an axis and a notch applied parallel to the axis in a lateral surface of the workpiece, the method comprising:
applying a cut-in beam on the workpiece, the cut-in beam having a front end, a rear end, a head end and a foot end, where the head end of the cut-in beam is inserted with a form fit into the notch of the workpiece and the foot end of the cut-in beam protrudes out of the notch;
holding the workpiece with a feed device so as to position an axis of the work piece parallel to axes of a cylindrical wire guide rollers of a wire saw;
moving the cut-in beam of the workpiece, using the feed device, in a feed direction perpendicularly through a planar wire web, where the planar wire web has sections of wire arranged parallel to one another and perpendicular to the axes of the wire guide roller, the wire sections being guided multiple times in a spiral around grooves in the wire guide rollers such that the cut in beam is moved first with the foot end against the wire web and the work piece is moved first with the notch against the wire web; and
moving the wire sections in the longitudinal wire direction by rotation of the wire guide rollers in the same direction and at the same circumferential speed in the presence of abrasives acting as a grinding agent.

2. The method as recited in claim 1, wherein the wire sections exhibit constant bending in the feed direction when the workpiece is moved through the wire web.

3. The method as recited in claim 1, wherein the wire sections exhibit variable bending in the feed direction when the cut-in beam foot end is moved through the wire web.

4. The method as recited in claim 3, wherein the foot end is moved through the wire web such that the bending of the wire sections assumes a maximum which is no longer achieved in the further course of the cutting process.

5. The method as recited in claim 1, wherein an adhesive is used to bond the head end of the cut-in beam into the notch when applying the cut-in beam on the workpiece.

6. The method as recited in claim 1, wherein the cut-in beam has a height, between the head end and the foot end, which is constant between the front side and the rear side.

7. The method as recited in claim 1, wherein the cut-in beam is in the shape of a circular cylinder.

8. The method as recited in claim 1, wherein the shape of the cross section of the foot end varies between the front side and the rear side in the feed direction, such that the wire sections cut into the cut-in beam with decreasing engagement lengths.

9. The method as recited in claim 8, wherein the shape of the cross section of the foot end becomes increasingly wedge-shaped between the front side and the rear side in the feed direction.

10. The method as recited in claim 1, wherein the cut-in beam has a height, between the head end and the foot end, which decreases between the front side and the rear side, such that the wire sections cut commensurately later into the cut-in beam the longer the wire path between the wire sections and a start of the wire web.

11. The method as recited in claim 1, further comprising conducting a test cut where the cut-in beam is obviated and the maximum depth of cut-in waves in the wafers is determined.

12. The method as recited in claim 11, wherein the height of the foot end is equal to or greater than the maximum depth determined.

13. The method as recited in 12, wherein the grooves are arranged perpendicularly over the wire sections after a position displacement of the wire sections in the direction of the axes of the wire guide rollers, caused by thermal expansion at the operating temperature.

14. The method as recited in claim 1, wherein the side of the cut in beam side has grooves lying opposite the wire web, the grooves being arranged perpendicularly over the wire sections.

* * * * *